United States Patent [19]

Marik

[11] Patent Number: 5,894,109
[45] Date of Patent: Apr. 13, 1999

[54] LOCKNUTLESS CONDUIT CONNECTOR

[75] Inventor: Greg Marik, Germantown, Tenn.

[73] Assignee: Thomas & Betts Corporation, Memphis, Tenn.

[21] Appl. No.: 08/710,269

[22] Filed: Sep. 13, 1996

[51] Int. Cl.$^6$ .................................................. H02G 3/18
[52] U.S. Cl. ........................................................ 174/65 R
[58] Field of Search .......................... 174/65 R, 65 G,
174/152 G, 153 G, 151; 248/56; 16/2.1,
2.2; 285/195, 194, 373, 419

[56] References Cited

U.S. PATENT DOCUMENTS

| Re. 15,891 | 8/1924 | Thomas, Jr. ............................ 285/218 |
|---|---|---|
| D. 336,282 | 6/1993 | Guginsky . |
| 1,525,014 | 2/1925 | Volk, Jr. ............................ 248/56 X |
| 2,490,286 | 12/1949 | Tomblom . |
| 2,643,136 | 6/1953 | Schesser . |
| 2,776,153 | 1/1957 | Smith ............................ 285/373 X |
| 2,945,085 | 7/1960 | Billups ............................ 174/153 G |
| 3,123,662 | 3/1964 | Fink ............................ 174/65 R |
| 3,148,899 | 9/1964 | Grinstead . |
| 3,174,776 | 3/1965 | Berger . |
| 3,258,822 | 7/1966 | Schlesch et al. ............................ 285/373 X |
| 3,556,566 | 1/1971 | Bromberg . |
| 3,643,290 | 2/1972 | Milne ............................ 248/56 X |
| 4,156,103 | 5/1979 | Dola et al. . |
| 4,619,332 | 10/1986 | Sheehan ............................ 174/65 R |
| 4,907,626 | 3/1990 | Mori ............................ 16/2.1 X |
| 4,990,721 | 2/1991 | Sheehan ............................ 174/65 R |
| 4,995,647 | 2/1991 | Carey . |
| 5,069,586 | 12/1991 | Casey ............................ 16/2.1 X |
| 5,200,575 | 4/1993 | Sheehan ............................ 174/65 R |

FOREIGN PATENT DOCUMENTS

| 492883 | 5/1953 | Canada ............................ 174/65 R X |
|---|---|---|
| 12151521 | 10/1989 | Japan ............................ 174/153 G X |

OTHER PUBLICATIONS

Advertisement, ½" & New ¾" No–Locknut EMT Connectors, Raco Inc. 1983.
Advertisement, New Steel Box Connector For MC, AC and Flex Cable, Appleton Electric Company, 1995.
Advertisement, Speedlock™ Steel Box Connectors, O–Z/ Gedney, Sep., 1994.

*Primary Examiner*—Dean A. Reichard
*Attorney, Agent, or Firm*—Hoffmann & Baron, LLP

[57] ABSTRACT

A locknutless conduit connector provides for the retentive termination of an electrical conduit to a junction box. The connector includes a connector housing having a conduit receiving end, an opposed conductor egressing end and a central conduit passage therebetween. The conduit passage is defined by opposing connector halves which are relatively movable with respect to one another in clam-shell fashion and which include male and female cooperating engagement members positioned to prevent relative axial movement between the connector halves when the connector is subjected to bending forces.

8 Claims, 6 Drawing Sheets

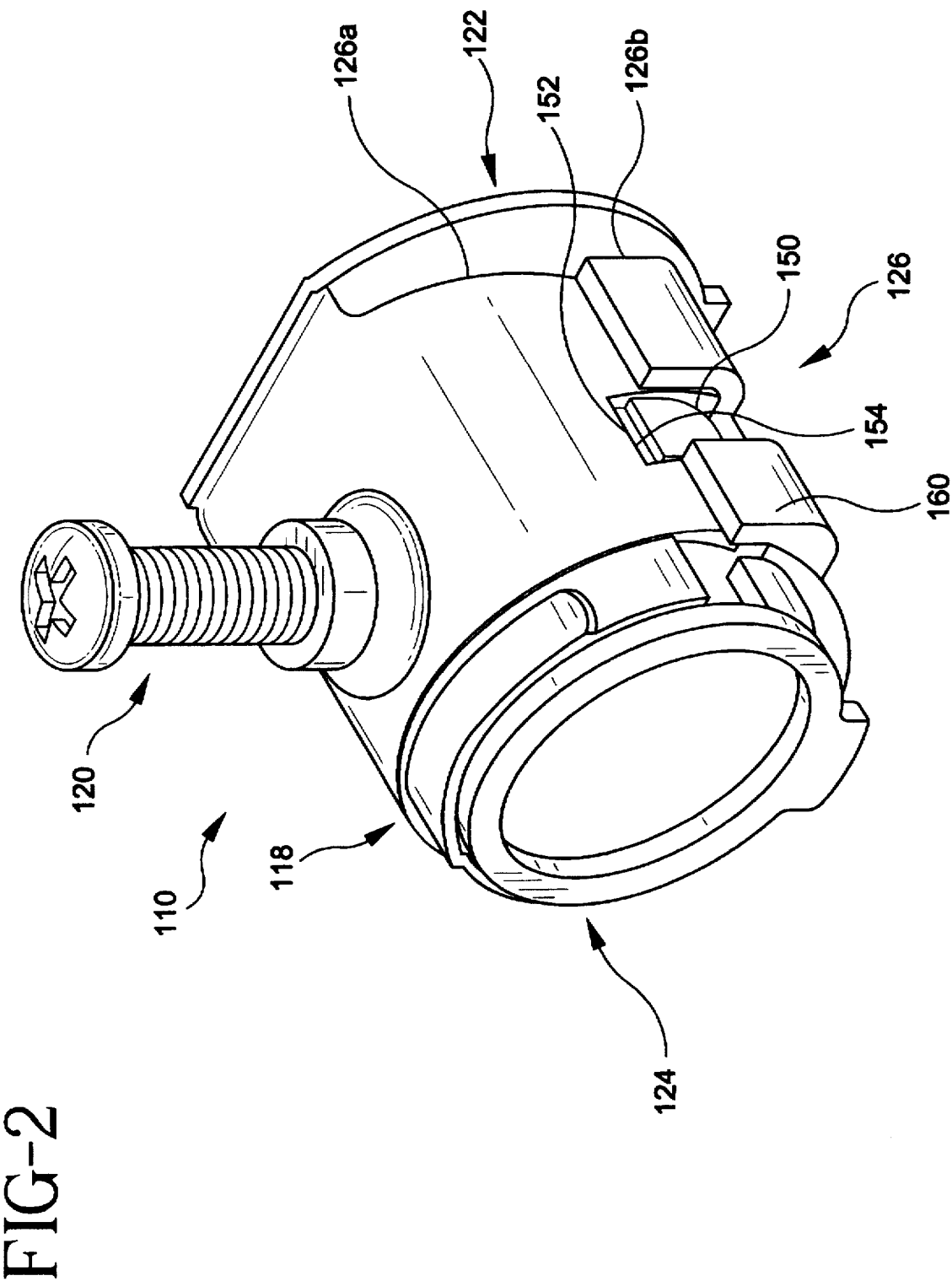

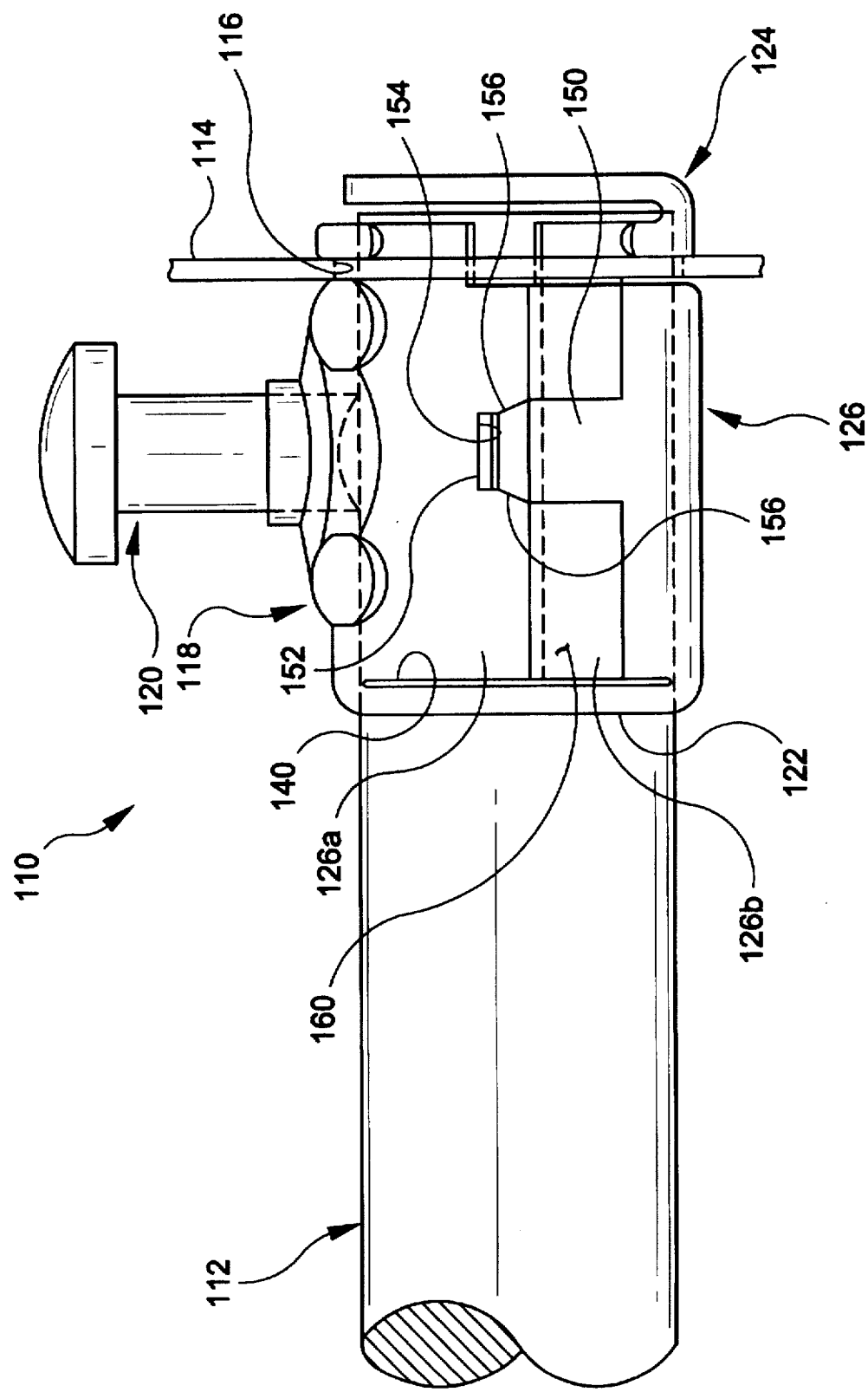

LOCKNUTLESS CONDUIT CONNECTOR

FIELD OF THE INVENTION

The present invention relates to connectors used to retentively terminate conduit to an electrical junction box and, more particularly, to locknutless connectors having increased mechanical integrity.

BACKGROUND OF THE INVENTION

In both commercial and residential construction, electrical conductors which run between various locations are typically housed in an outer protective jacket. Such structures are referred to as electrical conduits. One such conduit is a flexible, metallic conduit where the conduit includes an outer helically convoluted metal jacket for enhanced flexibility. Another such conduit is a rigid extruded metal tubing commonly referred to as EMT. The conduit is terminated to an electrical junction or outlet box and the individual conductors are terminated to an electrical device supported in the junction box.

In order to suitably retain the conduit in the junction box, a conduit connector or fitting is employed to terminate the conduit and to mechanically and electrically secure the conduit to the junction box itself. Conduit connectors of this type are well-known in the electrical connection art. These connectors typically include a cylindrical body which supports therein an end extent of the conduit. The cylindrical body is attachable to the junction box through a knockout opening to allow passage of the conductors into the junction box. A screw may be interposed through the wall of the connector body to engage the conduit thereby securely retaining the conduit within such connector body.

As mentioned, the connector is mechanically secured to the junction box. One end of the connector is positioned such that it extends through the knockout opening in the junction box and terminates within the junction box. In one application, the end extending into the junction box is threaded for receipt of a securing nut which is installed from the inside of the junction box, thus mechanically securing the connector to the box. In another application, examples of which are disclosed in U.S. Pat. Nos. 3,174,776 and 3,556,566, the cylindrical body of the connector is formed in a split-shell arrangement, whereupon tightening of the screw against the conduit causes the respective shells of the connector body to expand outwards thereby engaging the walls of the junction box about the opening.

Although the split-shell connector eliminates the need for a separate securing nut (which is often difficult to install due to limited room in the junction box), split-shell connectors are more susceptible to failure resulting from application of a moment to the connector. For example, a bending force experienced by the connector (which may be imparted thereon by rigid conduit such as EMT) may cause relative axial movement between the upper end lower body portion of the connector which, in turn, may be sufficient to allow pullout of the conduit from the connector or pullout of the connector from the junction box. The split-shell connectors are particularly susceptible to this type of failure when EMT is employed as the electrical conduit. As a result, EMT has typically in the past been terminated at the junction box with a conventional connector and locknut.

Thus, there is a need in the art for a split-shell type connector having increased mechanical integrity thus providing increased resistance to pullout failure resulting from application of bending forces to the connector.

SUMMARY OF THE INVENTION

The present invention, which addresses the needs of the prior art, relates to a connection device for terminating electrical conduit to a knockout opening in an electrical junction box. The device includes an elongate connector housing formed from a single metal stamping and having a conduit receiving end, an opposed conductor egressing end and a conduit-supporting passage extending therebetween. The conduit supporting-passage defines an axial direction. The device further includes a housing including upper and lower connector halves relatively movable with respect to one another in clam-shell fashion about the conduit receiving end from a first position which allows the conductor egressing end to be inserted into the knockout opening and a second position which fixedly secures the conductor egressing end in the knockout opening of the electrical junction box. The connector halves include male and female cooperating engaging members sized and positioned to prevent relative axial movement between the connector halves when the electrical conduit is subjected to bending forces while still allowing the connector halves to move from the first position to the second position. Finally, the housing includes conduit engaging means for retentively engaging the electrical conduit within the conduit supporting passage.

In one preferred embodiment, the male engagement member comprises a key formed in one of the connector halves and the female engagement member comprises a keyway formed in the other of the connector halves. The key is positioned to engage the keyway when the connector is subjected to bending forces thus locking the connector halves against axial movement therebetween and is dimensioned to remain engaged with the keyway as the halves are moved from the first position to second position.

As a result, the present invention provides a split shell-type connector formed from a single metal stamping having increased mechanical integrity. This increased mechanical integrity prevents the respective connector halves from undergoing relative axial movement when subjected to bending forces thus providing increased resistance to pullout failure. As a result, the present invention is particularly suitable for use with rigid metal conduit such as EMT.

BRIEF DESCRIPTION OF THE DRAWINGS

FIG. 2 is a perspective view of the locknutless conduit connector of the present invention;

FIG. 3 is a side elevational view of the connector of FIG. 2 showing an end extent of EMT conduit terminated to a junction box;

DETAILED DESCRIPTION OF THE INVENTION

Figure 1:
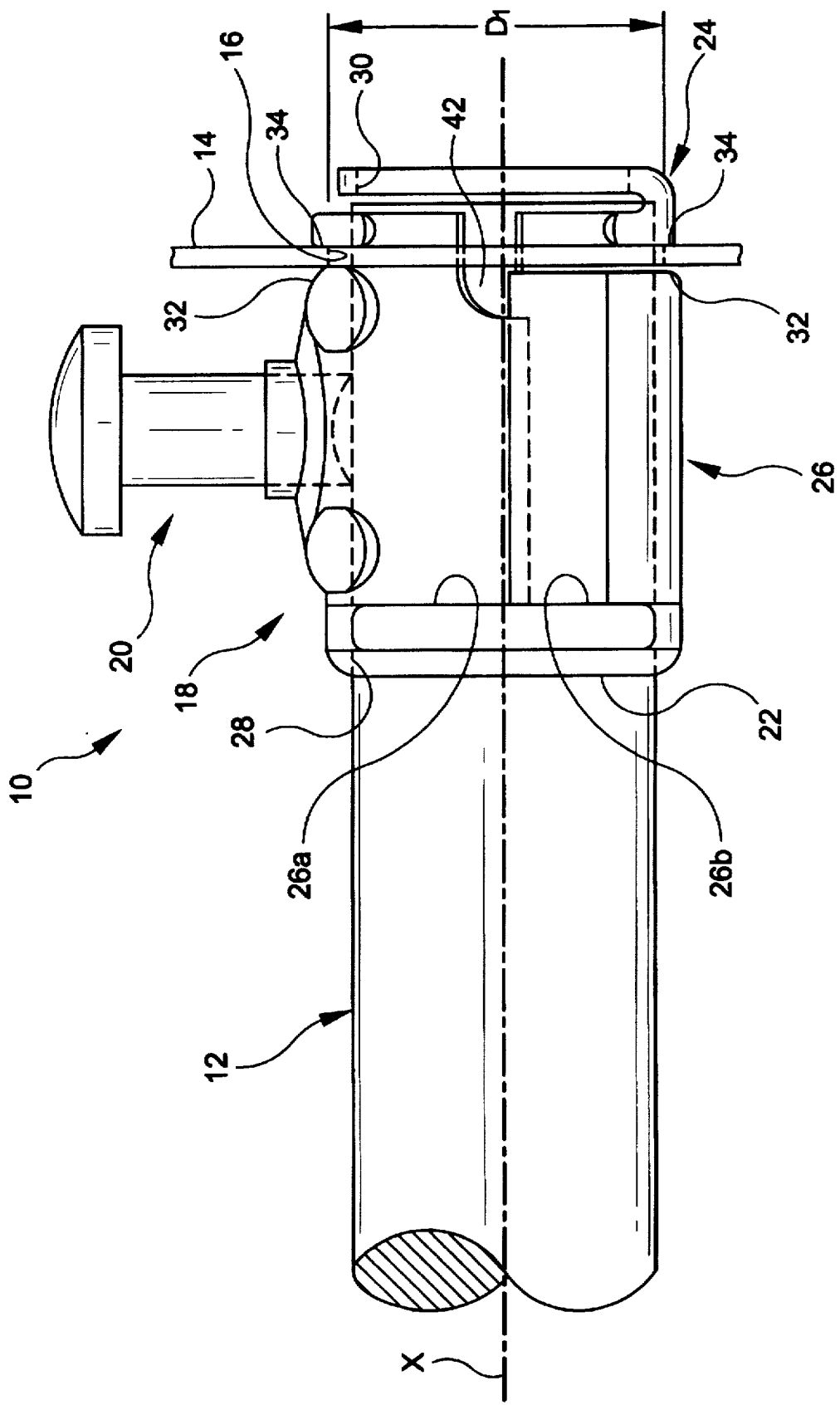
FIG. 1 is a side elevational view of a prior art connector used to terminate an end extent of conduit to a junction box.

A prior art locknutless conduit connector 10 for terminating an electrical conduit 12 to an outlet box 14 is shown in FIG. 1. More particularly, connector 10 is secured to a knockout opening 16 formed in outlet box 14. Knockout opening 16 is preferably a circular opening having a diameter $D_1$.

Connector 10 includes an elongate cylindrical-shaped housing 18 formed from a single metal stamping and a conduit engaging screw 20. Housing 18 includes a conduit receiving end 22 and an opposed conductor egressing end 24. Housing 18 further includes a conduit-supporting passage 26 extending between conduit receiving end 22 and conductor egressing end 24. This conduit-supporting passage 26 defines an axial direction X.

Conduit 12 shown in FIG. 1 is formed of extruded metal tubing (EMT) and is used to surround and thereby protect an electrical conductor (not shown) extending therethrough. The electrical conductor, itself, is typically contained within an electrically-insulating jacket. Of course, more than one electrical conductor can extend through the conduit.

Conduit receiving end 22 includes a generally circular opening 28 which is sized to allow electrical conduit 12 to pass therethrough. Conductor egressing end 24 includes a generally circular opening 30 through which the conductors carried within electrical conduit 12 may extend through and thus into junction box 14. To prevent abrasive engagement of the insulated conductors with the metallic edge defining circular opening 30, a plastic insulative throat (not shown) may be situated therein.

Connector housing 18 is formed from a flat metal blank. More particularly, a metal sheet is stamped and thereafter formed into the configuration shown in FIG. 1. As will be apparent to those skilled in the art, the manufacture of conduit connectors from a single metal stamping process is a commercially practical manner of forming such device.

Conduit-supporting passage 26 of connector 10 includes upper and lower relatively movable connector halves 26a and 26b, respectively, which are movable in a clam shell fashion about the conduit receiving end 22. Stated differently, the conduit receiving end forms a pivot about which the connector halves may rotate. In conventional fashion, the connector may be secured to knockout opening 16 of junction box 14 by squeezing the upper and lower halves 26a and 26b together to radially compress the connector housing at the conductor egressing end. Once the conductor egressing end is inserted through knockout opening 16, the resiliency of the housing causes the upper and lower halves to expand radially outward to secure the connector to the junction box.

Each of connector halves 26a, 26b is preferably formed with opposing lips 32, 34 which are spaced a sufficient distance from one another as to capture the wall of the junction box therebetween. Moreover, the diameter of the housing between the lips is approximately equal to the diameter of the knockout opening 16 when the housing is in a relaxed state.

To install the connector to the junction box, the conductor egressing end is radially compressed until the diameter defining lips 34 is reduced to $D_1$, thus allowing the conductor egressing end to pass through knockout opening 16. The conductor egressing end is then released whereby the resiliency of the housing causes the connector halves to expand radially outward thereby loosely retaining the wall of the junction box between lips 32 and 34.

In conventional fashion, an end extent of conduit 12 is inserted into the connector through conduit receiving end 22. Conduit 12 is inserted such that its forward edge substantially abuts against the insulative throat. The conductors carried by the conduit are then extended through conductor egressing end 24, through the insulative throat, and into the junction box.

In order to securely retain the connector within the knockout opening, screw 20 is tightened until the tip of the screw becomes firmly engaged with the outer diameter of the end extent of conduit supported therein. Continued tightening of screw 20 forces conduit 12 against the lower interior surface of the connector housing. Further additional tightening of screw 20 forces the upper and lower body halves 26a and 26b apart thereby expanding housing 18 to a point where upper and lower lips 34 are placed in tight firm engagement with the periphery of opening 16 of junction box 14. Thus, the tightening of screw 20 both secures the conduit 12 within the housing 18 of connector 10 and secures the connector within the knockout opening 16 of junction box 14. In order to provide for increased resistance against axial pullout of conduit 12 from connector 10, the connector may include a plurality of inwardly directed lances (not shown) extending from a lower interior surface of the housing. The lances are positioned in transverse and longitudinal spaced apart relationship and extend for engagement with the outer surface of conduit 12.

Figure 1A:
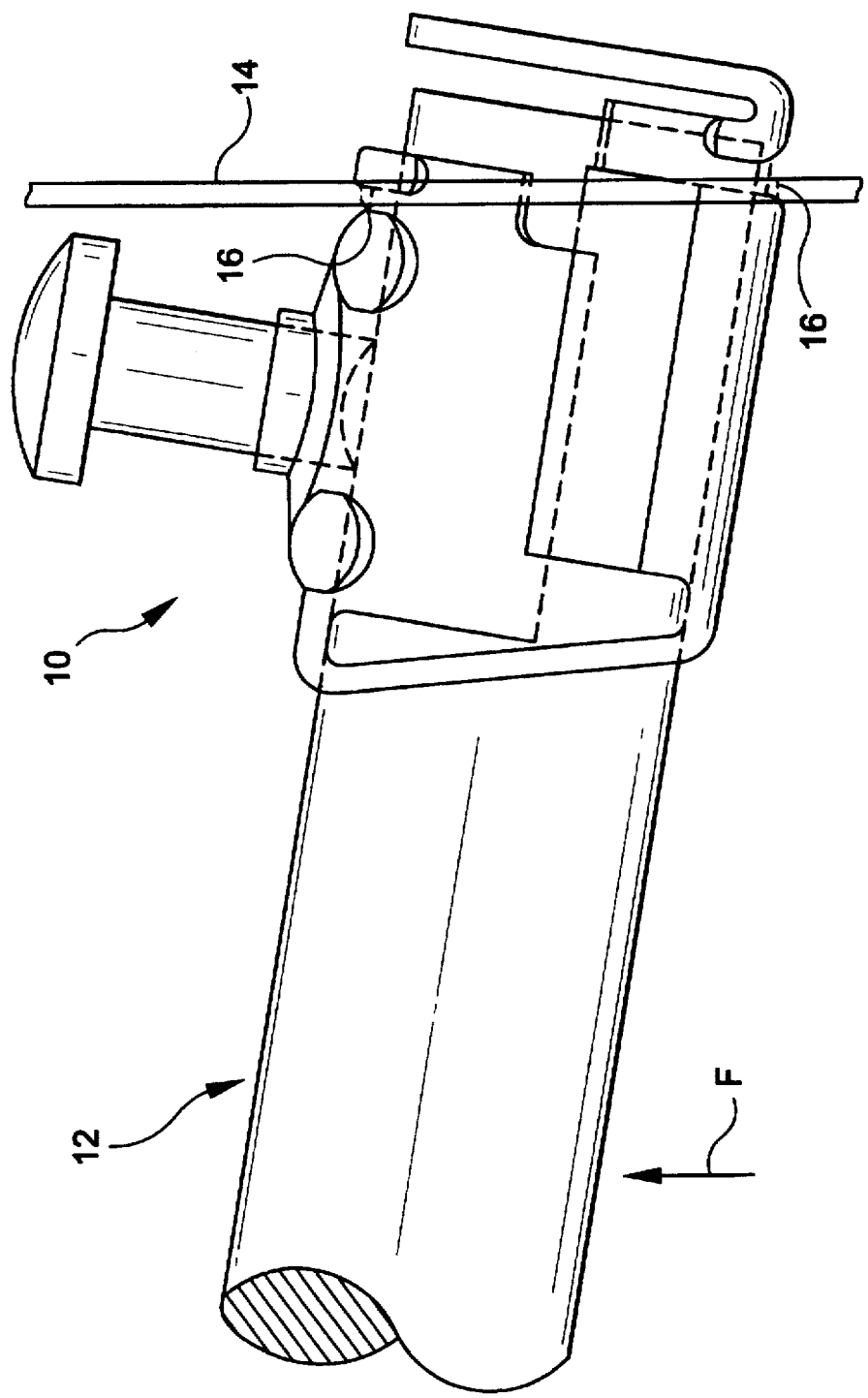
FIG. 1a is a view similar to FIG. 1 wherein the prior art connector has been subjected to a bending moment.

Rigid metal conduit (e.g., EMT), unlike flexible metal conduit, is capable of transferring a large bending force, i.e., a moment, to the connector. Referring to FIG. 1a, if a force F is applied to conduit 12 at an axial distance from the junction box, a bending force will be imparted on the prior art connector 10 of FIG. 1. This bending force causes the connector halves to undergo relative axial movement with respect to one another. As a result, the diameter defined by the lips 34 (as measured along a plane parallel to the wall of the junction box) is reduced to substantially $D_1$, thus allowing the connector to be pulled through the knockout opening and away from the outlet box. Alternatively, the relative axial movement of the connector halves may cause the screw tip to loosen its bite on the conduit, thus allowing pullout of the conduit from the connector in addition to or rather than pullout of the connector from the junction box. Although the application of bending forces to a connector is more readily apparent with use of EMT, bending moments may also be imparted on the connector by other types of conduit including flexible metal conduit.

Although connectors exist for use with rigid metal conduit which will resist deformation of the connector when subjected to bending forces, such prior art connectors are typically formed from tubular metal and utilize a locknut. It has been discovered herein that a locknutless conduit connector can be formed from a single metal stamping in such a manner as to resist bending forces imparted thereon by, for example, rigid conduit such as EMT. As mentioned, the locknutless feature is highly desirable in many applications and the single metal stamping facilitates commercial production of the product.

Referring to FIG. 2, a locknutless conduit connector 110 formed in accordance with the present invention is shown. Connector 110 includes a housing 118 formed from a single metal stamping and a conduit engaging screw 120. Housing 118 includes a conduit receiving end 122 and a conductor egressing end 124. The housing further includes a conduit-supporting passage 126 which extends between the conduit receiving end and the conductor egressing end. Conduit-supporting passage 126 is formed of upper and lower connector halves 126a and 126b, respectively.

More particularly, it has been discovered herein that the relative transverse slippage experienced by the upper and lower connector halves which have been subjected to bending forces can be eliminated if the two connector halves are secured to one another in a manner which resists transverse slippage therebetween as discussed further hereinbelow, but still allows the connector housing to be radially compressed for insertion into the knockout opening of the junction box and thereafter radially expanded to securely retain the connector to the junction box.

As shown in FIGS. 2–3, the connector halves include male and female cooperating engagement members, i.e., key 150 and keyway 152. Keyway 152 is formed in connector half 126a and is sized and positioned to receive key 150 formed in connector half 126b. A small rectangular opening 154 exists above the key 150 and is of sufficient dimension to allow the conductor egressing end to be radially compressed to a diameter which allows insertion of the conductor egressing end into the knockout opening 116 of the junction box 114. Moreover, both the key and keyway are preferably formed with beveled surfaces 156 to facilitate the pivoting of the connector housing about the conduit receiving end when inserted into the knockout of the junction box.

The male and female engagement member may be formed in any number of configurations, as long as the configuration secures the connector halves against relative transverse slippage therebetween while allowing radial compression of the conductor egressing end for insertion of the connector into the knockout opening of the junction box. More particularly, the engagement members interferingly engage with one another when the connector halves are subjected to bending forces through 360° of rotation, thus locking the halves together against respective axial movement of the connector halves.

The male and female cooperating engagement members must secure connector half 126a to connector half 126b and thus are preferably integrally formed with such connector halves. Moreover, the cooperating engagement members of the present invention must resist transverse slippage of the respective connector halves during application of bending forces through 360° of rotation. It is to be noted that the conduit receiving end lacks sufficient strength as to resist the transverse slippage between the connector halves during application of bending forces thereto.

The connector halves preferably overlap one another along the axial length of the connector. In one preferred embodiment, connector half 126b is formed with an axially-extending arcuate portion 160 which is stepped radially outwardly therefrom. This arcuate portion is of sufficient circumferential length as to overlap a portion of the connector half 126a. As will be apparent to those skilled in the art, this overlap allows the conductor egressing end to be compressed for insertion into the knockout opening of the outlet box.

Figure 4:
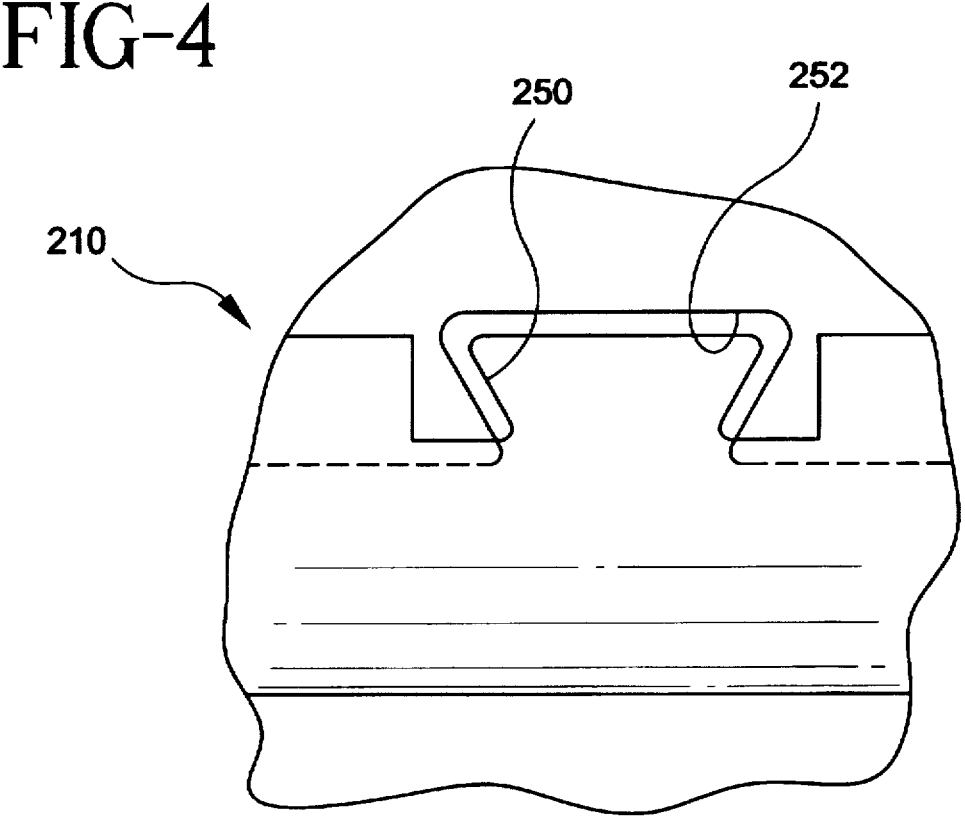
FIG. 4 is a side elevational detail of an alternative embodiment of the present invention.
Figure 5:
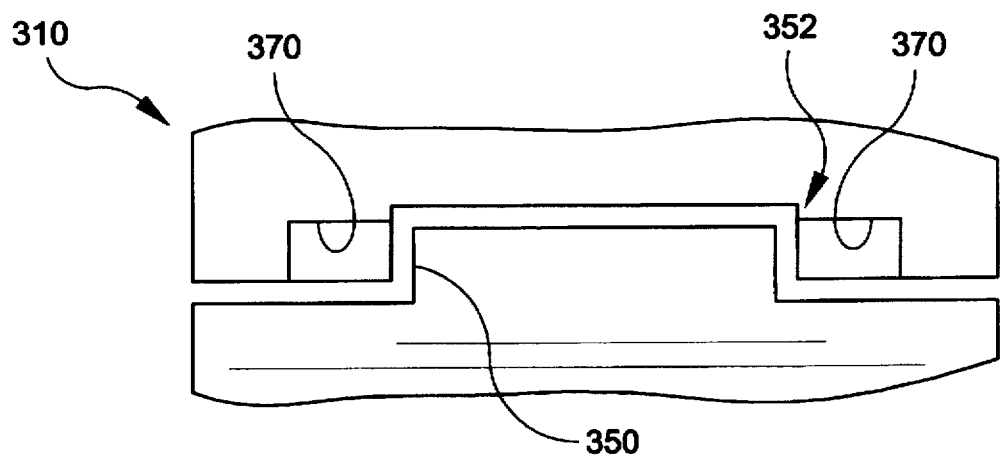
FIG. 5 is a side elevational detail of another embodiment of the present invention.
Figure 5A:
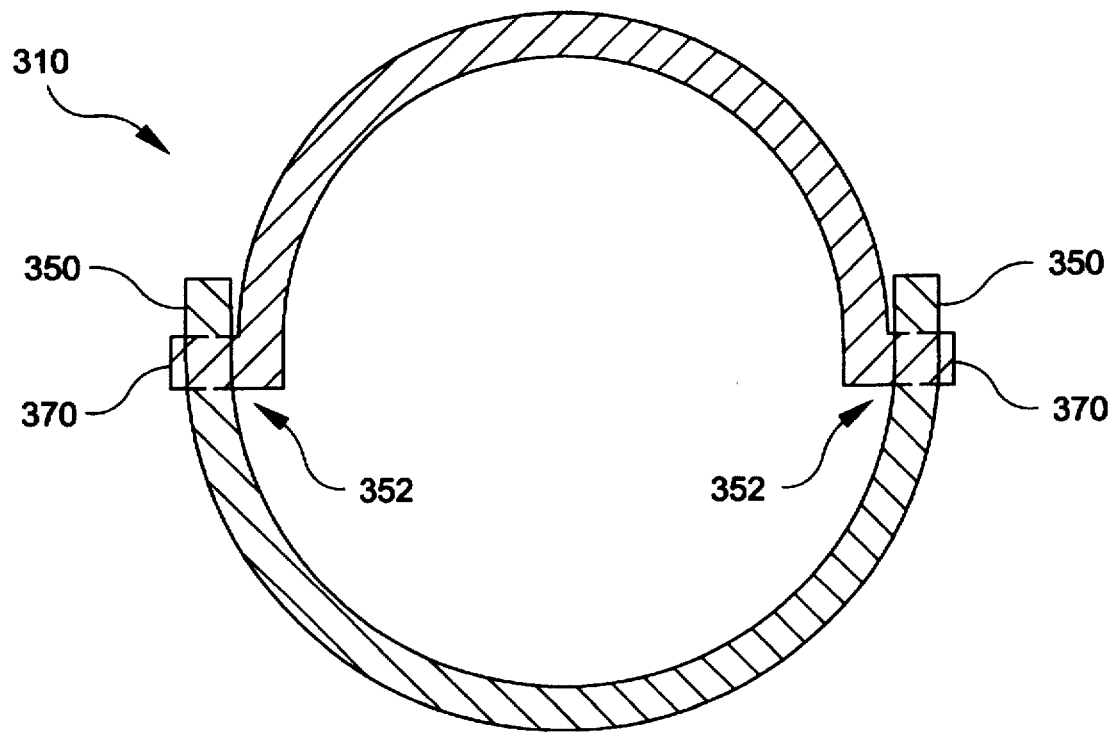
FIG. 5a is a front elevational section of the embodiment of FIG. 5.

In one preferred embodiment, as shown in FIG. 4, the male and female engagement members of connector 210 are formed in a dovetail arrangement and include male engagement member 250 and female engagement member 252. In another preferred embodiment, as shown in FIGS. 5 and 5a, female engagement member 352 of connector 310 includes legs 370 which project outward from the circumference of the housing body to capture the male engagement member 350 therebetween.

Figure 6:
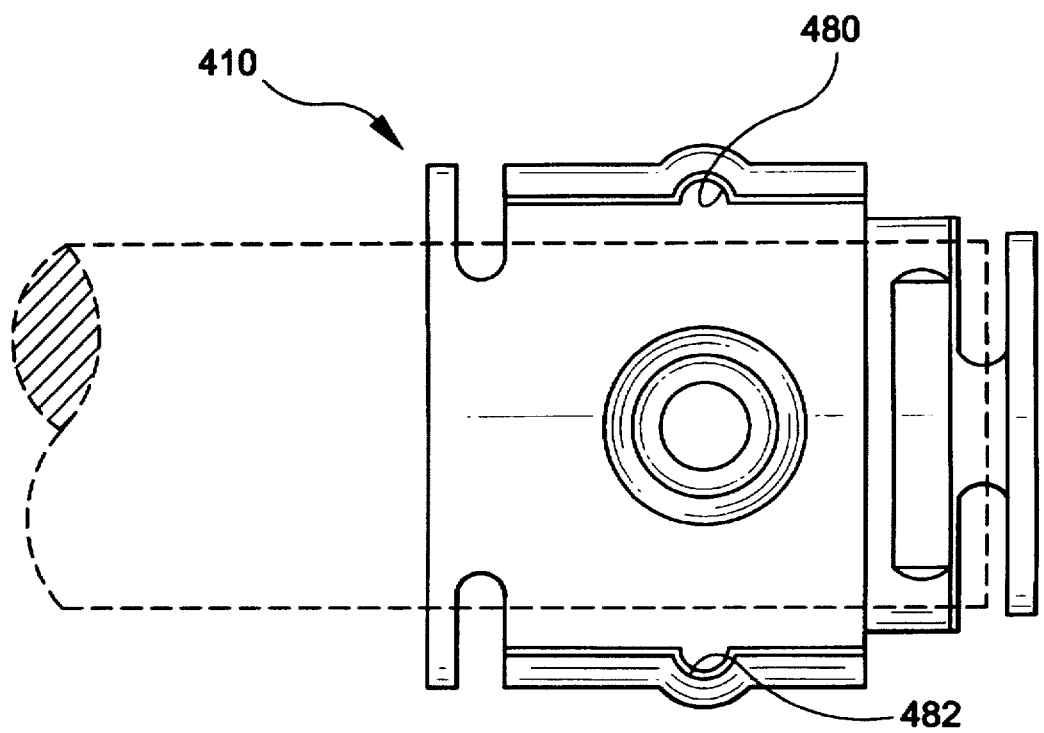
FIG. 6 is a top view of a still further embodiment of the present invention.

In another preferred embodiment, as shown in FIG. 6, one of the connector halves of connector 410 is formed with a rib 480 and the other connector half is formed with a groove 482 sized to receive the rib. The interaction of the rib and groove provides sufficient resistance to transverse slippage of the respective connector halves, while still allowing sufficient radial compression of the conductor egressing end for insertion of the conducter egressing end into the knockout opening in the outlet box.

As is known to those skilled in the art, EMT is often installed in masonry walls and/or floors. The connector of the present invention is therefore configured to minimize any gaps and openings which would allow concrete to enter the connector and thereafter come in contact with the conductors. As shown in FIG. 3, opening 140 has been substantially reduced in size as compared to the opening shown in the prior art connector of FIG. 1. In addition, opening 42 of the prior art connector of FIG. 1 has been removed. The key and keyway are preferably formed as to maintain a minimum amount of clearance along the beveled edges as to minimize the size of any gap associated therewith.

Various changes to the foregoing described and shown structures would now be evident to those skilled in the art. Accordingly, the particularly disclosed scope of the invention is set forth in the following claims.

What is claimed:

1. A connection device for terminating electrical conduit to a knockout opening in an electrical junction box, said device comprising:

an elongate connector housing formed from a single metal stamping and having a conduit receiving end, an opposed conductor egressing end and a conduit-supporting passage extending therebetween, said conduit-supporting passage defining an axial direction;

said housing including upper and lower connector halves relatively movable with respect to one another in clam-shell fashion about said conduit receiving end between a first position which allows said conductor egressing end to be inserted into said knockout opening and a second position which fixedly secures said conductor egressing end in said knockout opening of said electrical junction box, and wherein said connector halves include male and female cooperating engagement members sized and positioned to prevent relative axial movement between said connector halves when said electrical conduit is subjected to bending forces while allowing said connector halves to move from said first position to said second position; and conduit engaging means for retentively engaging said electrical conduit within said conduit-supporting passage and for moving said connector halves from said first position to said second position, said conduit engaging means including a conduit engaging screw threadably advancable through said housing against said conduit whereupon tightening of said screw against said conduit secures said conduit within said conduit-supporting passage and secures said connection device to said junction box.

2. The device according to claim 1, wherein said male engagement member comprises a key and is connected to one of said connector halves and said female engagement member comprises a keyway and is connected to the other of said connector halves, and wherein said key is positioned to engage said keyway when said connection device is subjected to bending forces thus locking said connector halves against axial movement therebetween and is dimensioned to remain engaged with said keyway as said halves are moved from said first position to said second position.

3. The device according to claim 2, wherein both said key and said keyway include beveled side edges.

4. The device according to claim 2, wherein both said key and said keyway are dovetail in shape.

5. The device according to claim 1, wherein said female engagement member includes outwardly projecting legs which capture said male engagement member therebetween.

6. The device according to claim 1, wherein said male engagement member comprises a rib formed on one of said connector halves and said female engagement member comprises a groove formed on the other of said connector halves, and wherein said rib is positioned to engage said groove when said connection device is subjected to bending forces thus locking said connector halves against axial movement therebetween and is dimensioned to remain engaged with said groove as said halves are moved from said first position to said second position.

7. The device according to claim 1, wherein each of said cooperating engagement members is integrally formed with one of said connector halves.

8. The device according to claim 1, wherein said male and female cooperating engagement members prevent relative axial movement between said connector halves when said electrical conduit is subjected to bending forces through 360° of rotation.

* * * * *